(12) United States Patent
Lee

(10) Patent No.: US 12,221,990 B2
(45) Date of Patent: Feb. 11, 2025

(54) FASTENER ASSEMBLY FOR BLIND MOUNTING

(71) Applicant: Illinois Tool Works Inc., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 281 days.

(21) Appl. No.: 17/224,244

(22) Filed: Apr. 7, 2021

(65) Prior Publication Data

US 2021/0332842 A1    Oct. 28, 2021

Related U.S. Application Data

(60) Provisional application No. 63/015,304, filed on Apr. 24, 2020.

(51) Int. Cl.
*F16B 19/10*    (2006.01)
*F16B 5/06*    (2006.01)

(52) U.S. Cl.
CPC ........ *F16B 19/1081* (2013.01); *F16B 5/0642* (2013.01)

(58) Field of Classification Search
CPC ........................... F16B 19/1081; F16B 5/0642
USPC ............................................................ 411/45
See application file for complete search history.

(56) References Cited

U.S. PATENT DOCUMENTS

| 6,910,840 B2* | 6/2005 | Anscher | F16B 19/1081 |
| | | | 411/41 |
| 9,457,734 B2* | 10/2016 | Smith | F16B 21/075 |
| 2018/0148003 A1* | 5/2018 | Hübner | B60R 13/0243 |
| 2020/0032829 A1* | 1/2020 | Lee | F16B 21/125 |

\* cited by examiner

*Primary Examiner* — Lindsay M Low
*Assistant Examiner* — Omar Morales
(74) *Attorney, Agent, or Firm* — Quarles & Brady LLP

(57) ABSTRACT

A fastener assembly includes a pin and a body. The pin includes a shaft that inserts into a central passage of the body. The body includes a flange and first and second arms that attach to a nose at a distal end. Each of the first and second arms includes an exterior flex point, an interior flex point, and a proximal end. The first arm is configured to move about a first proximal hinge portion. The second arm is configured to move about a second proximal hinge portion. A first brace extends from a first arm, a second brace extends from a second arm, and the first and second braces create an overlap area between the first arm and the second arm.

20 Claims, 9 Drawing Sheets

FASTENER ASSEMBLY FOR BLIND MOUNTING

RELATED APPLICATION

This application claims the benefit of, and priority from, U.S. Provisional Application No. 63/015,304 filed Apr. 24, 2020, which is hereby incorporated by reference in its entirety.

BACKGROUND

Field of the Disclosure

Examples of the present disclosure generally relate to a fastener assembly and, more particularly, to a fastener assembly capable of blind mounting in a panel.

Description of the Background of Disclosure

In the field of manufacturing, fasteners are used for assembling components. Fasteners often penetrate a panel having an aperture pre-fabricated for receiving a fastener. Further, some fasteners penetrate multiple panels that are stacked or arranged, such that the aperture of each component must be aligned so the fastener can be accurately inserted through each aperture. However, aligning multiple apertures may require physical access to both front and back sides of the panel, and may also require careful, time-consuming attention to achieve a tight alignment.

One solution has been to provide multi-component fastener assemblies. However, this often requires tools throughout the assembly process, and may still require physical access to front and back sides of a panel. Further, multi-component fastener assemblies may include small components that are easily lost and/or damaged. Another solution has been to provide single component fastener assemblies. However, securing multiple panels often requires insertion through multiple loosely-aligned apertures, and may further require high clamp loads to achieve a proper fit. Still further, such single component fastener assemblies often cannot be removed for servicing or reuse. These challenges can cause damaged components, excess manual labor, and/or increased costs.

SUMMARY

In one aspect, a fastener assembly includes a pin and a body. The pin includes a shaft that inserts into a central passage of the body. The body includes a flange and first and second arms that attach to a nose at a distal end. Each of the first and second arms includes an exterior flex point, an interior flex point, and a proximal end. The first arm is configured to move about a first proximal hinge portion. The second arm is configured to move about a second proximal hinge portion. A first brace extends from a first arm, a second brace extends from a second arm, and the first and second braces create an overlap area between the first arm and the second arm.

In one example, the body further comprises first and second ribs disposed within the central passage, and the pin includes first and second notches positioned along the shaft. The first and second notches are configured to receive the first and second ribs in a shipping configuration. The shaft further includes first and second slots that are configured to receive the first and second ribs in an installed configuration. In some examples, the flange of the body includes an upper surface having an upper thin section, a lower surface having a lower thin section, and an aperture formed through the flange. A gap is defined between the bottom surface of the head and the upper thin section of the flange.

In some examples, a fastener assembly includes a pin having a shaft extending from a head of the pin and a body having a flange including a central passage, a first arm, a second arm, and a nose. The shaft is configured to be inserted into the central passage, wherein the first and second arms are joined at a distal end that is near the nose, and wherein each of the first arm and the second arm includes an exterior flex point, an interior flex point, and an arcuate brace, the arcuate brace of the first arm extending toward the second arm.

For example, the shaft of the pin includes a first notch, the body includes a first rib, and the first notch is figured to receive the first rib. The first notch is positioned on a first recess wall adjacent a first recess surface. The first rib is disposed within the central passage. The shaft of the pin includes a second notch, the body includes a second rib, and the second notch is configured to receive the second rib. The second notch is positioned on a second recess wall adjacent a second recess surface. The first rib and the second rib are disposed within the central passage. The shaft of the pin includes a first slot positioned nearer to the head than the first notch, the first slot being configured to receive the first rib of the body. The shaft of the pin includes a second slot positioned nearer to the head than the second notch, the second slot being configured to receive a second rib. The pin and the body are integrally formed. The pin becomes detached from the body prior to installation.

In some examples, a fastener assembly includes a pin having a shaft, a body having a nose, and a panel having an opening configured to receive the pin and the body. When the fastener assembly is inserted into the opening and the pin is inserted within a central passage of the body, the pin and the nose move toward the panel, and the body includes a pair of alignment tabs that cooperate with a pair of recess walls on the shaft of the pin. The pin includes a shaft having a first notch on a first surface and a second notch on a second surface. The body includes a flange, a first arm having a first brace, and a second arm having a second brace.

When the shaft of the pin is partially received within the central passage of the body, the first notch and the second notch are positioned near the flange. When the shaft of the pin is fully received within the central passage of the body, the first notch and the second notch are spaced apart from the flange. The pin and the body are integrally formed.

The pin has a head from which the shaft extends, the head having a lower surface that is configured to face the panel without contacting the panel. The body defines a V-shaped area that is configured to at least partially receive the shaft.

In some examples, a fastener assembly includes a pin having a shaft that extends away from a lower surface of a head, and a body having a flange, a nose, a first arm, and a second arm. The first arm and the second arm are both coupled to the flange and the nose. The first arm is configured to move about a first proximal hinge portion, the second arm is configured to move about a second proximal hinge portion. A first brace extends from the first arm and a second brace extends from the second arm. The body includes a pair of ribs disposed within a central passage. The shaft includes a foot, a first surface, a second surface, a pair of notches, and a pair of slots. The pair of ribs are configured to fit within at least one of the pair of notches or the pair of slots, and the first brace and the second brace are configured to engage the first surface and the second surface of the shaft.

DETAILED DESCRIPTION

Examples of the present disclosure provide a fastener assembly including a pin that engages a body. The pin includes a shaft having notches and slots positioned therealong. The body includes first and second extended arms joined to each other at a nose and a flange. Each of the first and second extended arms includes an exterior flexure point, an interior flexure point, and a brace. The flange of the body includes a central aperture having a pair of ribs disposed therein. The notches of the pin are configured to receive the pair of ribs when the fastener assembly is in an as-shipped configuration, and the slots are configured to receive the pair of ribs when the fastener assembly is in an as-installed configuration. The shaft of the pin further includes first and second recessed surfaces being configured to receive the brace of the first arm and the second arm, respectively, when the fastener assembly is in the as-installed configuration. The exterior flexure point and the interior flexure point of each arm provide a controlled collapse that prevents unwanted wear on the body and, thus, promotes continued use, reuse, replacement, and an extended service life.

In some examples, the pin and the body are integrally formed as a unitary component. For example, the pin and the body may be manufactured by a single-shot molding process. The shaft of the pin includes a molding tab that connects to the flange of the body. The molding tab can provide a pathway for material to flow during a molding process. The molding tab may also secure the pin to the body prior to shipping, which can streamline the manufacturing and shipping processes and, thus, reduce associated costs.

In some examples the pin and the body are capable of being installed by mere hand forces, e.g., without tools or machinery. For example, the fastener assembly can be inserted by hand through one or more apertures in one or more panels, and the pin can be fully installed within the body by hand to provide a rigid clamping force for securing the one or more panels together and for securing the fastener assembly to the one or more panels. During and after the pin is installed within the body, the pin and the body interact with each other in a way that provides tactile feedback to a hand of a user, such that a user can feel when the pin and the body have reached an installed position.

In some examples, the brace of each of the first and second arms of the body further includes an alignment tab that engages a recess wall positioned along the shaft of the pin. The alignment tab and the recess wall cooperate to prevent misalignment during installation of the fastener assembly, and further prevent misalignment or detachment of the pin from the body after installation and while in use, such as by any external forces or vibrations that may be experienced.

Figure 1:
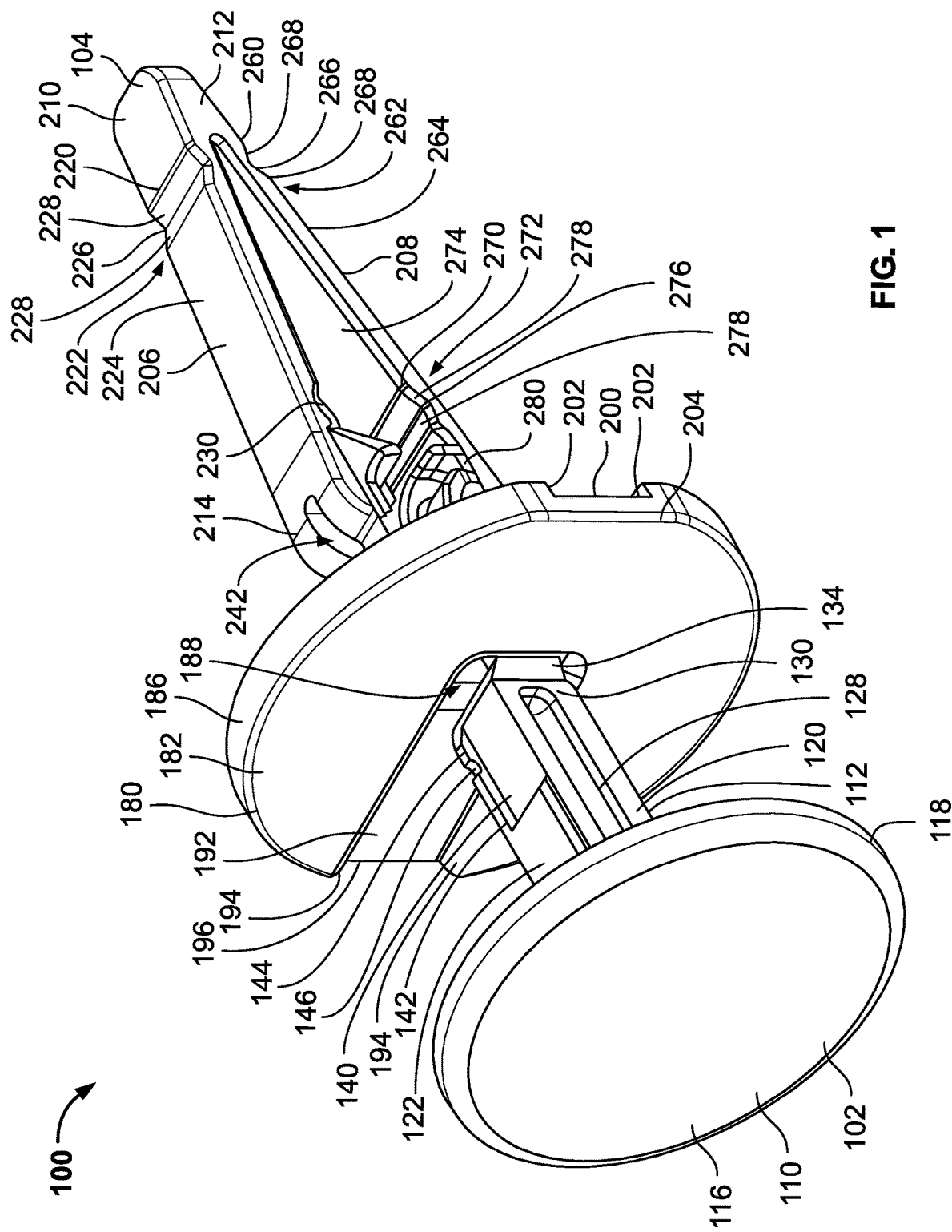
FIG. 1 is an isometric view of a right, front, and top view of one example fastener assembly.
Figure 2:
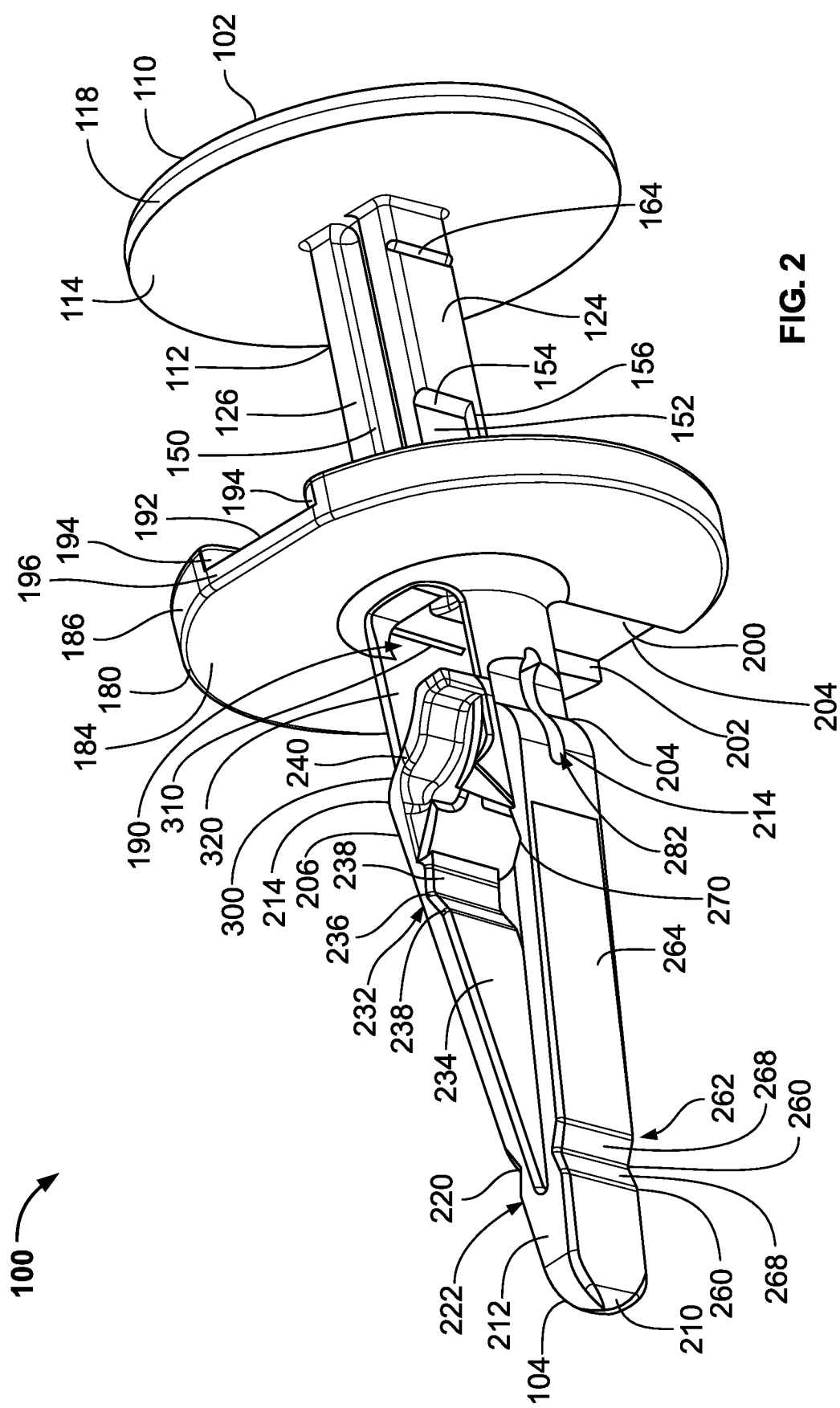
FIG. 2 is an isometric view of a left, rear, and bottom view of the fastener assembly of FIG. 1.

FIG. 1 illustrates a fastener assembly 100, according to one example of the present disclosure. The fastener assembly includes a pin 102 and a body 104. The pin 102 comprises a head 110 and a shaft 112 that extends away from a bottom surface 114 (see FIG. 2). The head 110 includes a top surface 116 configured to be pressed, pushed, or otherwise engaged by a user, such as by a user's hand, a tool, or the like. The head 110 also includes an edge 118 between the top surface 116 and the bottom surface 114. In the present example, the head 110 is disc-shaped, or cylindrical; however, in other examples the head 110 may be any shape, e.g., a rectangle, a square, a triangle, or the like. As illustrated in FIG. 2, the shaft 112 extends away from the bottom surface 114 in a substantially orthogonal direction; however, in other examples, the shaft 112 may extend away from the bottom surface 114 at a different angle. Further, the shaft 112 extends away from a center of the bottom surface 114; however, in some examples, the shaft 112 may extend from an off-center location of the bottom surface 114, nearer to one or more portions of the edge 118, or from a portion of the edge 118 instead of the bottom surface 114.

With reference to FIGS. 1 and 2, the shaft 112 includes a right sidewall 120 and a top sidewall 122, as well as a bottom sidewall 124 and a left sidewall 126. The right sidewall 120 includes an axial channel 128 formed thereon and extending between the bottom surface 114 of the head 110 and a foot 130 of the shaft 112. A planar foot surface 132 is located at the foot 130 of the shaft 112. As depicted in FIG. 1, a molding tab 134 extends from the foot surface 132 near the right sidewall 120. It is contemplated that the molding tab 134 could extend from a different surface of the pin 102. The top sidewall 122 includes first recessed surface 140 defined, at least partially, by a step 142 and a recess wall 144. The recess wall 144 has a first notch 146 formed thereon at a position nearer to the foot 130 than the step 142. The first notch 146 has a curved shape with a depth about half the height of the recess wall 144, as further illustrated in FIG. 3.

Figure 3:
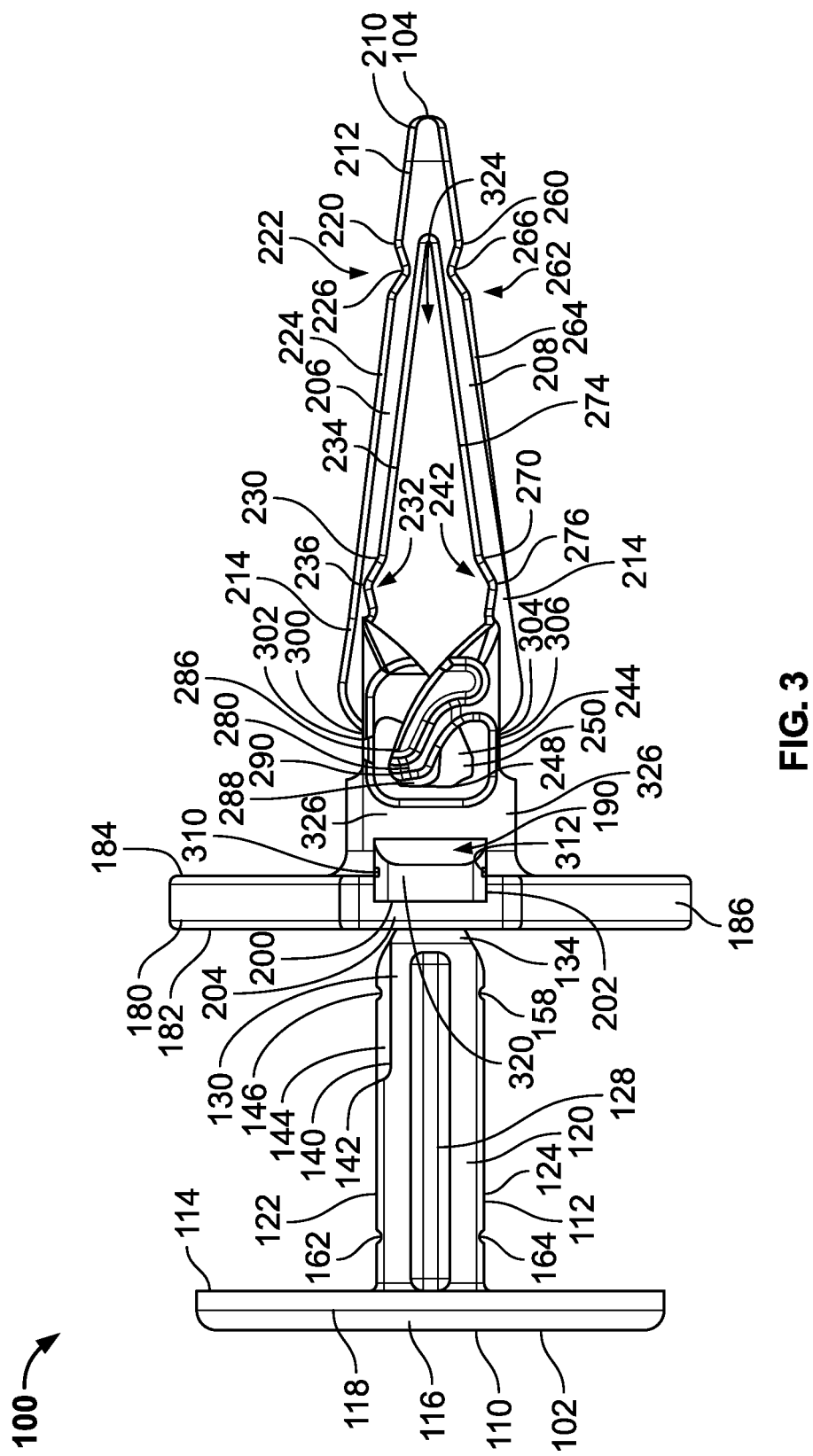
FIG. 3 is a right side elevational view of the fastener assembly of FIG. 1.

With continued reference to FIGS. 1 and 2, the left sidewall 126 includes an axial channel 150 formed thereon and extending between the bottom surface 114 of the head 110 and the foot 130 of the shaft 112. The bottom sidewall 124 includes a second recessed surface 152 that is defined, at least partially, by a step 154 and a recess wall 156. The recess wall 156 has a second notch 158 formed thereon at a position nearer to the foot 130 than the step 154. Further, first and second slots 162, 164 are formed on the top sidewall 122 and the bottom sidewall 124, respectively, at a position nearer to the head 110 than to the foot 130. As illustrated in FIG. 3, the first and second slots 162, 164 are positioned at a similar distance from the head 110.

Still referring to FIGS. 1 and 2, the body 104 includes a flange 180 having an upper surface 182 and a lower surface 184 with a peripheral edge 186 formed therebetween. An aperture 188 is formed through the flange 180 and in communication with a central passage 190. An upper thin section 192 is formed on the upper surface 182 and defined, at least partially, by track walls 194 running parallel with one another between the peripheral edge 186 and the aperture 188. Thus, the upper thin section 192 extends between the aperture 188 and the peripheral edge 186, and more particularly, a straight side 196 of the peripheral edge 186. As such, the upper thin section 192 has a generally rectangular shape. However, the peripheral edge 186 curves between the upper thin section 192 and a lower thin section 200. In another aspect, the flange 180 can have any shape, e.g., a rectangle, a square, a triangle, or the like. The lower thin section 200 is formed on the lower surface 184 and defined, at least partially, by track walls 202 running parallel with one another between the peripheral edge 186 and the central passage 190. Thus, the lower thin section 200 extends between the central passage 190 and the peripheral edge 186, and more particularly, a straight side 204 of the peripheral edge 186. As such, the lower thin section 200 has a generally rectangular shape.

With reference to FIGS. 1-4, the body 104 further comprises a first arm 206, a second arm 208, and a nose 210. Both the first arm 206 and the second arm 208 extend between a distal end 212 near the nose 210 and a proximal end 214 near the lower surface 184 of the flange 180. The first arm 206 includes an exterior flex point 220, e.g., a living hinge, located at a break 222 in an exterior surface 224 of the first arm 206. The exterior flex point 220 is defined by a hinge portion 226 that is positioned between and interconnects angled portions 228. Further, the first arm 206 includes an interior flex point 230, e.g., a living hinge, located at a break 232 in an interior surface 234 of the first arm 206. The interior flex point 230 is defined by a hinge portion 236 that is positioned between and interconnects angled portions 238. A first brace 240 extends from a position on the interior surface 234 that is adjacent the interior flex point 230. A void 242 is formed in the exterior surface 224 at a position that corresponds or aligns with the position of the first brace 240 on the interior surface 234. The first brace 240 is hook-shaped and includes an inner side 244, an outer side 246, a tip 248, and a free end 250.

With continued reference to FIGS. 1-4, the second arm 208 includes an exterior flex point 260, e.g., a living hinge, located at a break 262 in an exterior surface 264 of the second arm 208. The exterior flex point 260 is defined by a hinge portion 266 that is positioned and interconnects angled portions 268. Further, the second arm 208 includes an interior flex point 270, e.g., a living hinge, located at a break 272 in an interior surface 274 of the second arm 208. The interior flex point 270 is defined by a hinge portion 276 that is positioned between and interconnects angled portions 278. A second brace 280 extends from a position on the interior surface 274 that is adjacent the interior flex point 270. A void 282 is formed in the exterior surface 264 at a position that corresponds or aligns with the position of the second brace 280 on the interior surface 274. The second brace 280 is hook-shaped and includes an inner side 284, an outer side 286, a tip 288, and a free end 290.

As illustrated in FIG. 3, the first arm 206 includes a first proximal hinge portion 300, e.g., a living hinge, positioned near the proximal end 214. The first proximal hinge portion 300 joins the proximal end 214 of the first arm 206 and a first extended wall 302. Similarly, the second arm 208 includes a second proximal hinge portion 304, e.g., a living hinge, positioned near the proximal end 214. The second proximal hinge portion 304 joins the proximal end 214 of the second arm 208 and a second extended wall 306. The first and second extended walls 302, 306 have a thickness that is less than the thickness of the first and second arms 206, 208, and the proximal end 214 of each of the first arm 206 and the second arm 208 are curved. Accordingly, the curved shape of the proximal ends 214 and the reduced thickness of the first and second extended walls 302, 306 cooperate to promote rotation about the first and second proximal hinge portions 300, 304, respectively.

Still referring to FIG. 3, the first and second notches 146, 158 and first and second slots 162, 164 have similar depth and width dimensions. Each of the first and second notches 146, 158 and the first and second slots 162, 164 are configured to receive a first and second rib 310, 312 of the body 104 in an installed configuration, as seen in FIG. 5C. The first and second ribs 310, 312 are disposed along central passage walls 320, 326 that define the central passage 190 below the aperture 188 formed through the flange 180. The first and second ribs 310, 312 are configured to fit within the first and second slots 162, 164 in a manner that resists vibration, dislodgement, and other external forces, especially those forces associated with application in vehicles. The inner side 244 of the first brace 240 can be appreciated from FIG. 3, the first brace 240 being shaped as an arcuate member with the free end 250 and the tip 248 positioned near the first extended wall 302. Similarly, the outer side 286 of the second brace 280 can be appreciated from FIG. 3, the second brace 280 being shaped as an arcuate member with the free end 290 and the tip 288 positioned near the second extended wall 306.

Figure 4:
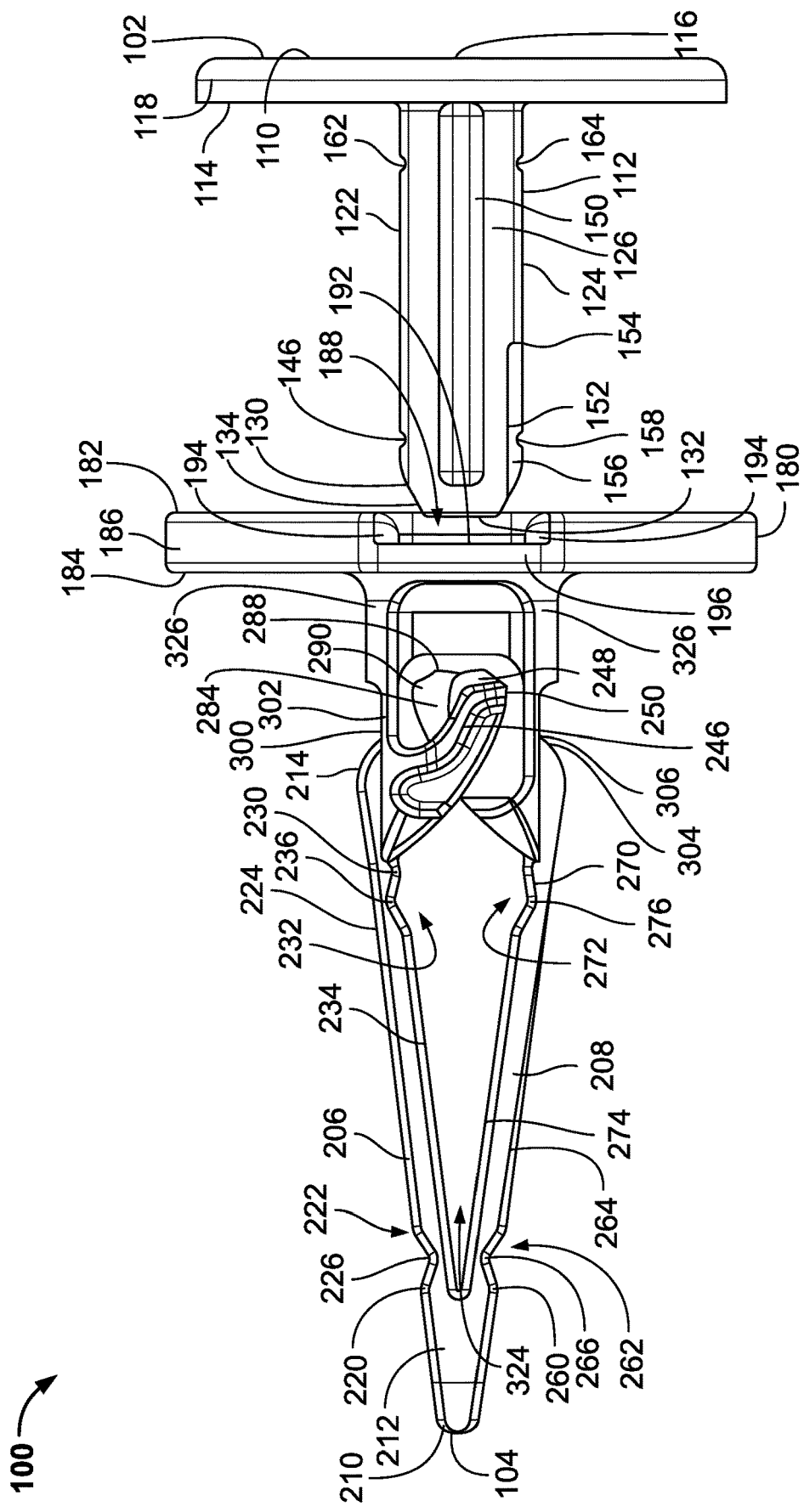
FIG. 4 is a left side elevational view of the fastener assembly of FIG. 1.

Referring to FIG. 4, the outer side 246 of the first brace 240, the tip 248, and the free end 250 are illustrated, from which the inner side 284 of the second brace 280 can be appreciated. As seen in FIGS. 3 and 4, the shapes of the first and second braces 240, 280 mirror each other and create an overlap area 322 between the first and second arms 206, 208. In addition, a V-shaped area 324 is created between the first and second arms 206, 208, and more specifically between the interior surfaces 234, 274 thereof. The profile of the exterior flex points 220, 260 and the interior flex points 230, 270 are illustrated, from which can be appreciated the thickness of the hinge portions 226, 236, 266, 276 relative to the thickness of the first and second arms 206, 208.

As can be appreciated from FIGS. 1-4, the first and second arms 206, 208 have a length that is greater than a length of the shaft. Accordingly, the body 104 can be inserted nose 210 first, for example, through an opening in a panel, or multiple aligned openings in stacked panels. Further, due to the long and slender shape of the first and second arms 206, 208, and because they are joined together at the distal end 212 near the nose 210, the fastener assembly is capable of being inserted through blind openings, i.e., openings not visible to a user during insertion. An example of the insertion and assembly process is depicted below in FIGS. 5A-5C.

Figure 5A:
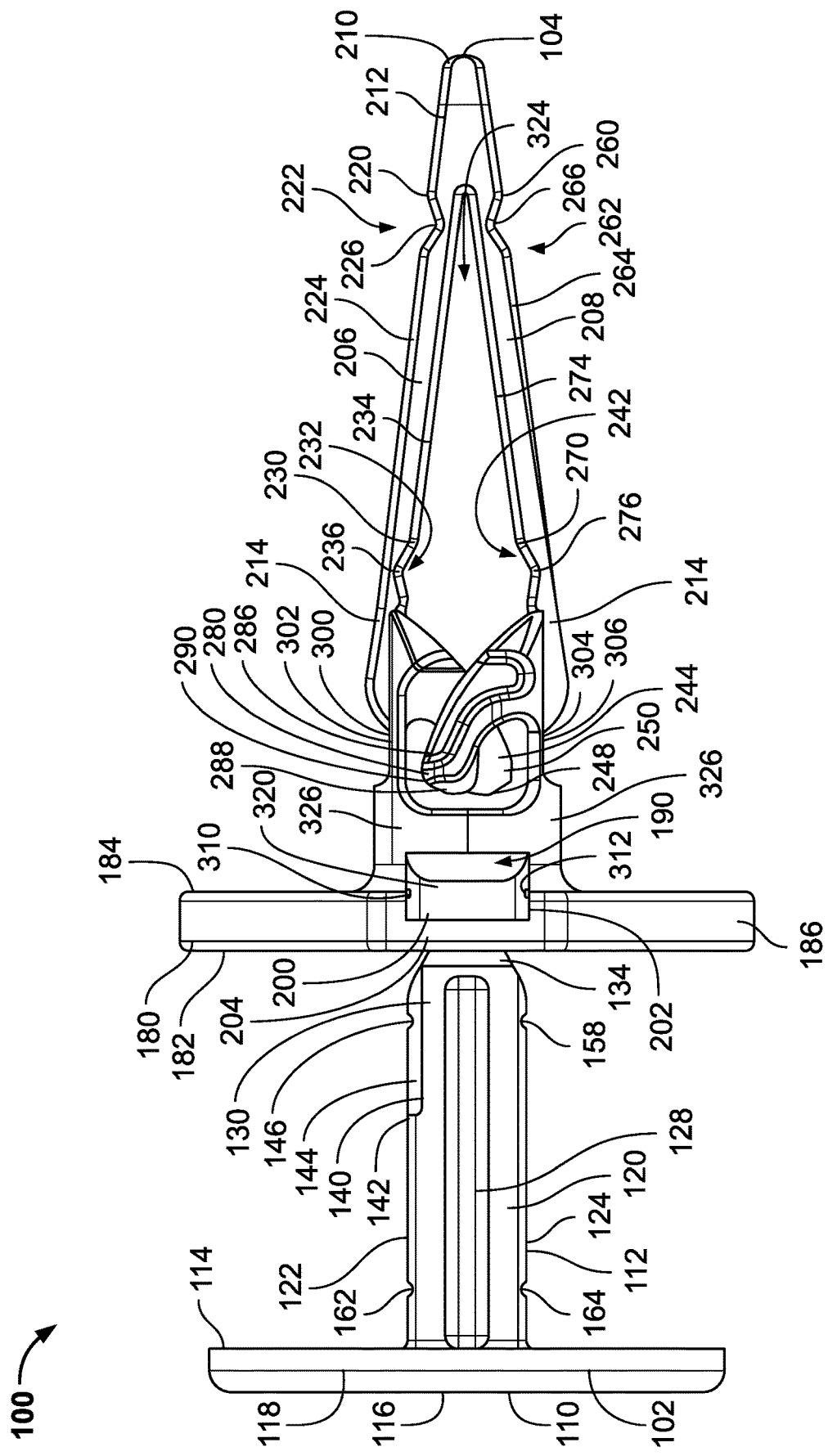
FIG. 5A is a right side elevational view of the fastener assembly of FIG. 1, the fastener being depicted in a molded configuration.

Now referring to FIG. 5A, the fastener assembly 100 is illustrated in a molded configuration, or an as-molded state, such that the molding tab 134 of the shaft 112 remains intact, attaching the pin 102 to the body 104. In some examples the pin 102 and the body 104 are formed simultaneously from a single cycle molding process, and the molding tab 134 is formed during the molding process to allow the material, in a liquid state, to flow through a mold cavity during the molding process. In this manner, the pin 102 and the body 104 can be formed simultaneously of the same material, e.g., a plastic material. In some examples, the pin 102 and the body 104 may be formed using a variety of other suitable molding processes, e.g., additive manufacturing, thermoforming, or the like. In some examples, the pin 102 and the body 104 can be manufactured separately and joined together subsequently.

Figure 5B:
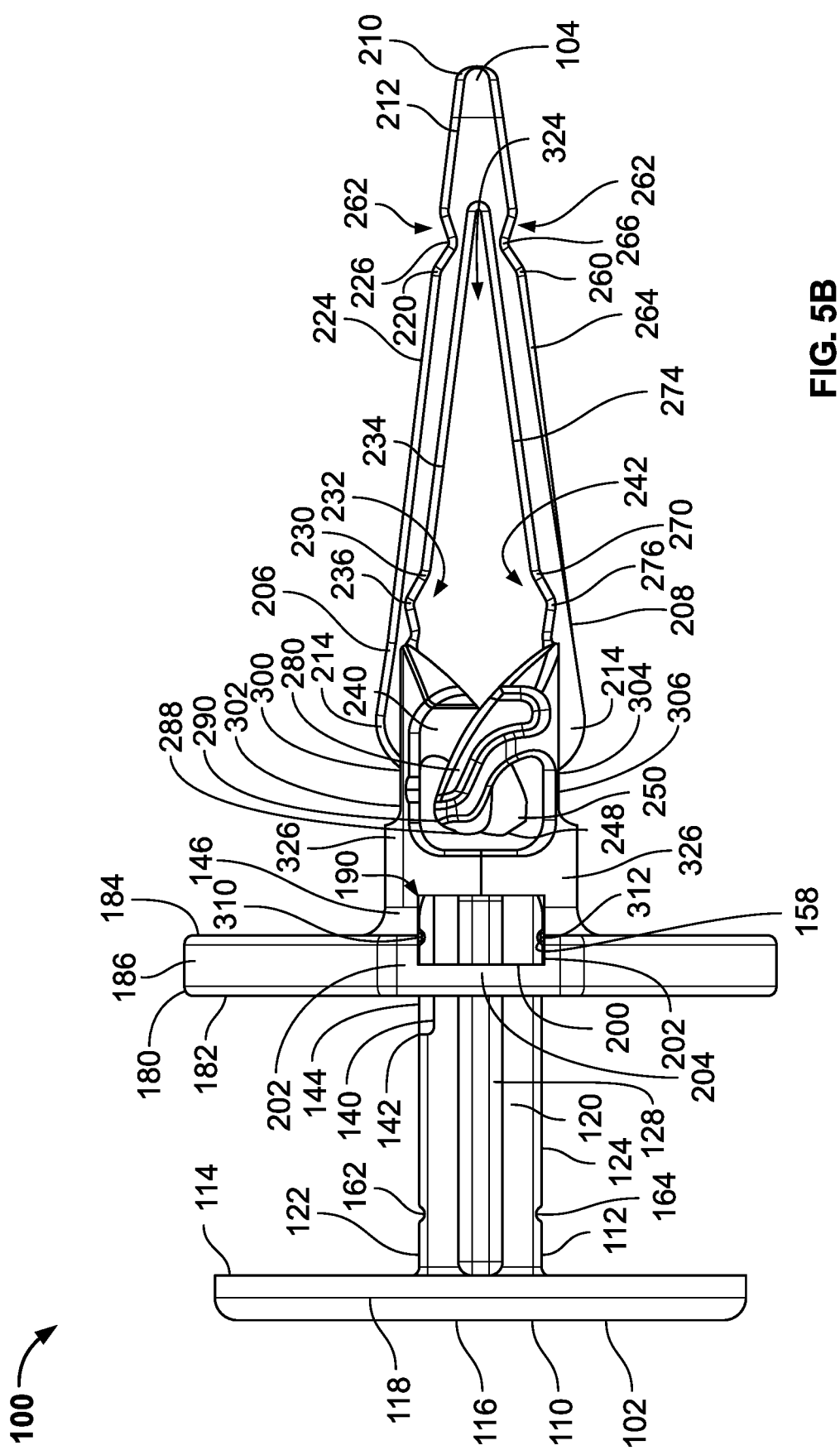
FIG. 5B is a right side elevational view of the fastener assembly of FIG. 1, the fastener being depicted in a shipping configuration.
Figure 5C:
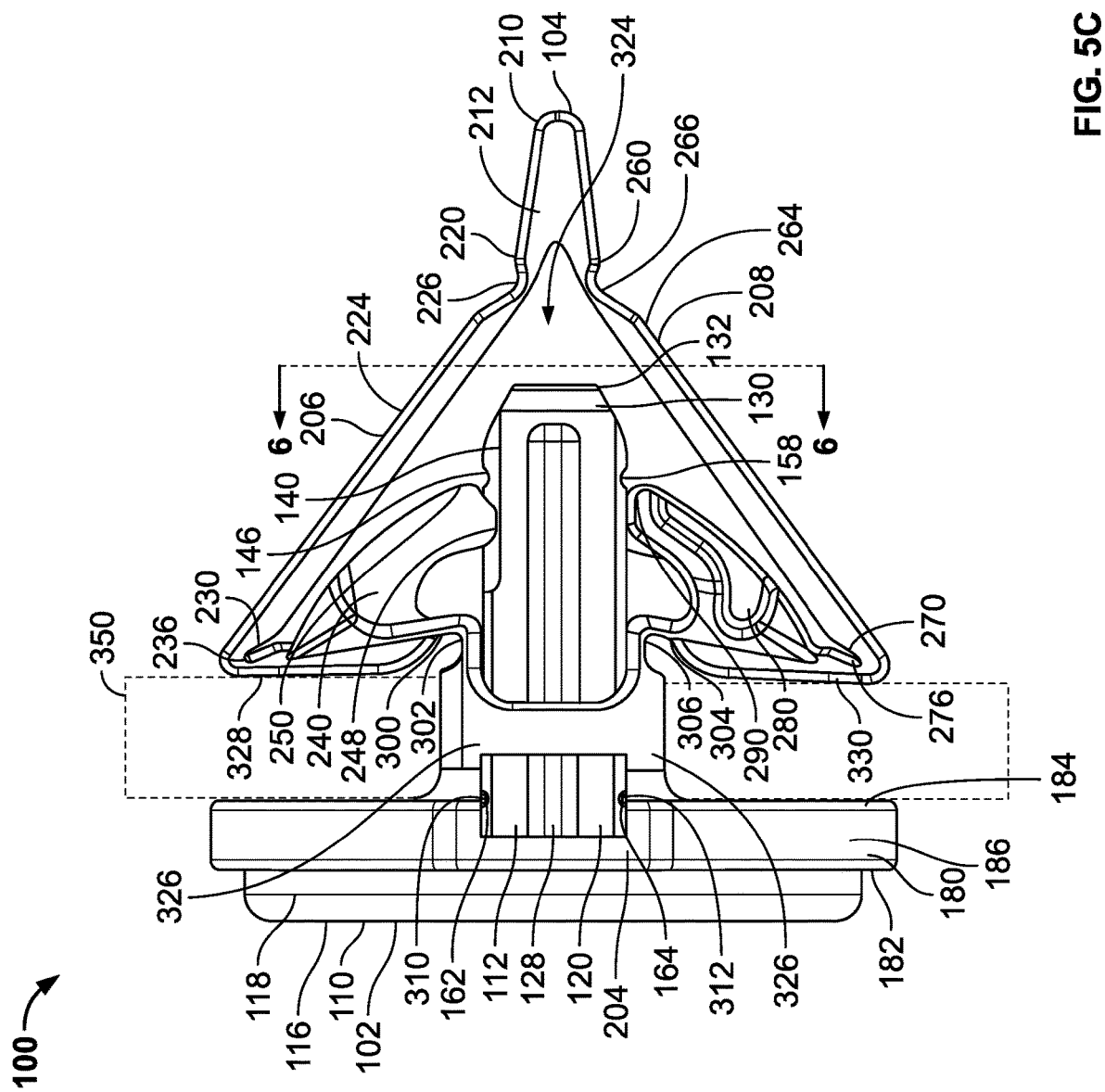
FIG. 5C is a right side elevational view of the fastener assembly of FIG. 1, the fastener assembly being depicted in an installed configuration.

Referring to FIG. 5B, the fastener assembly 100 is illustrated in a shipping configuration, such that the molding tab 134 is detached or sheared from the upper surface 182 of the flange 180. The foot 130 of the shaft is inserted through the aperture 188 and into the central passage 190 of the body 104 to cause the first and second notches 146, 158 to engage the first and second ribs 310, 312. The first and second ribs 310, 312 fit within the first and second notches 146, 158 in a manner resisting any external forces caused by shipping. Accordingly, the shaft 112, and therefore the pin 102, is captured by the body 104 prior to installation or insertion in a panel 350, as illustrated in phantom lines in FIGS. 5C and 6. Thus, the fastener assembly 100 undergoes division, such that the pin 102 and the body 104 are no longer one integral component, between a molded configuration and a shipping configuration, prior to being installed. In the shipping configuration, the first brace 240 and the second brace 280 maintain the overlap area 322, and the free ends 250, 290, respectively, are on opposing sides of the central passage 190 such that the free end 250 is located on the same side of the central passage 190 as the second arm 208, the free end 290 is located on the same side of the central passage 190 as the first arm 206, and both the free ends 250, 290 are located nearer to the lower surface 184 of the flange 180 than interior flex points 230, 270.

With reference to FIG. 5C, the fastener assembly 100 is illustrated in an installed configuration. When installed, the nose 210 of the body 104 is threaded or inserted through an opening of the panel 350. The shape, e.g., the length and slim profile, of the body 104 facilitates insertion of the body 104, and particularly the first and second arms 206, 208 and the nose 210 into a blind opening, or an opening that is not visible from a user's vantage point, or multiple openings stacked together. The user inserts the body 104 into such an opening(s), and after the lower surface 184 of the flange 180 contacts the panel 350, the user presses or pushes the top surface 116 of the head 110 to force the shaft 112 through the central passage 190 of the body 104. In this manner, the first and second ribs 310, 312 become dislodged from their fit within the first and second notches 146, 158, and the pin 102 continues moving axially toward the flange 180 of the body 104. The dislodgement of the first and second ribs 310, 312 from the first and second notches 146, 158 may provide a perceivable sensation or sound to a user.

During insertion, the foot surface 132 of the shaft 112 pushes on the free ends, 250, 290 of the first and second braces 240, 280. As a result, the first and second braces 240, 280 move, e.g., rotate, about the first and second proximal hinge portions 300, 304, and the arms flex or bend about their exterior flex points 220, 260 and interior flex points 230, 270. In this manner, each of the first and second braces 240, 280 moves away from each other, eliminating the overlap area 322 area. In the installed configuration, the free ends 250, 290, respectively, are moved to opposing sides of the central passage 190 such that the free end 250 is located on the same side of the central passage 190 as the first arm 206, the free end 290 is located on the same side of the central passage 190 as the second arm 208, and both the free ends 250, 290 are located farther from the lower surface 184 of the flange 180 than interior flex points 230, 270. Accordingly, the V-shaped area 324 widens and the nose 210 moves closer to the foot surface 132, and also to the panel 350, while remaining spaced apart therefrom. In this way, the body 104 collapses in length and, thus, reduces an occupied volume after installation. Ultimately, after the shaft 112 is fully inserted into the body 104, the first and second ribs 310, 312 fit within the first and second slots 162, 164 on the shaft 112 and, thus, can provide a perceivable sensation or sound to a user that indicates an installed position is reached, e.g., tactile feedback.

Figure 6:
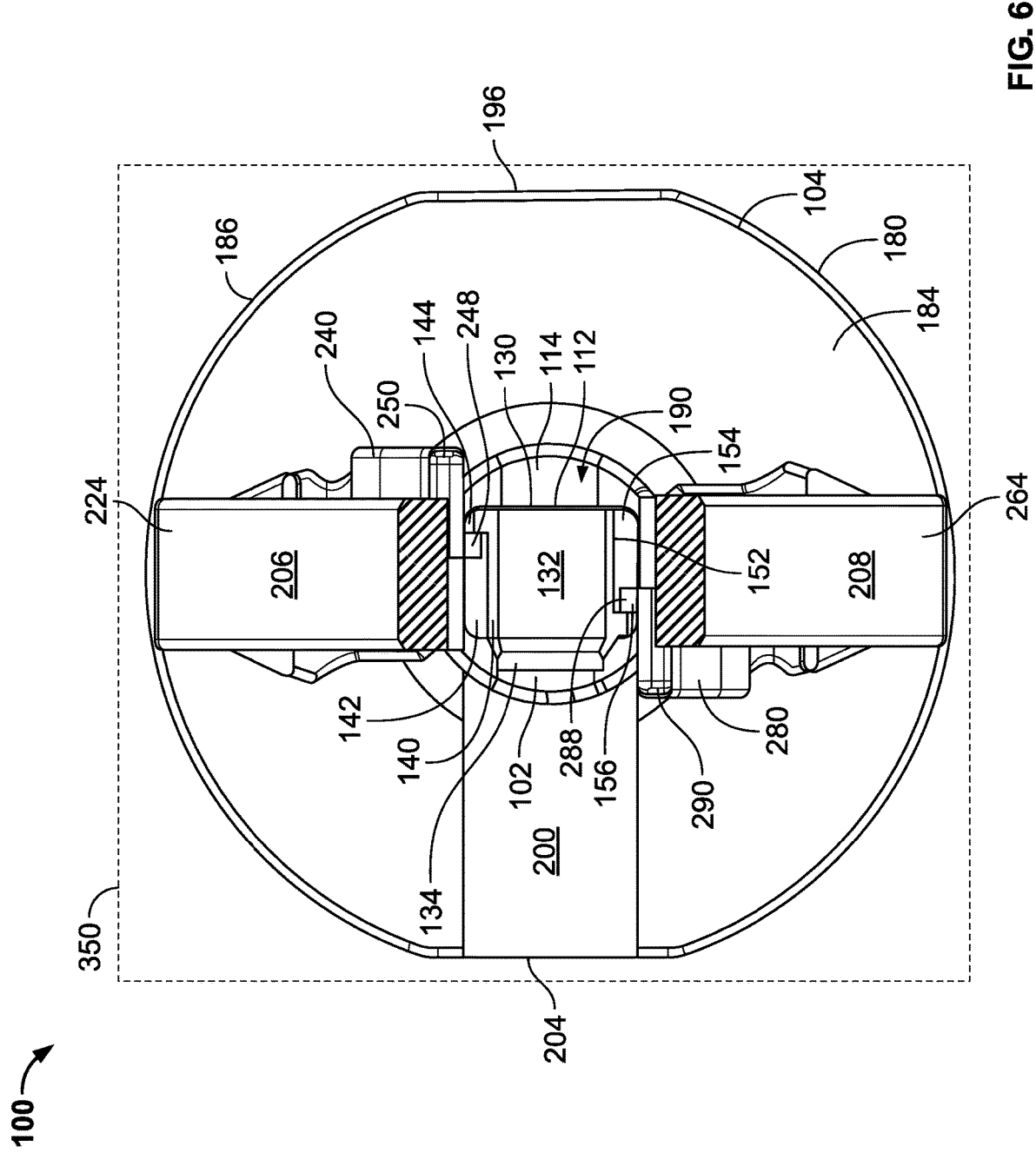
FIG. 6 is a cross-sectional view of the fastener assembly of FIG. 1, taken along the line 6-6 of FIG. 5C.

Referring to FIG. 6, the first brace 240 engages the first recess wall 144 and the second brace 280 engages the second recess wall 156, such as in a sliding relationship during insertion of the pin 102 into the body 104, experiencing frictional resistance promoted by compressive forces exerted therebetween. During insertion, and after reaching a fully installed configuration, the tip 248 of the first brace 240 extends toward the first recessed surface 140 of the shaft, and the tip 288 of the second brace 280 extends toward the second recessed surface 152 of the shaft 112. In this manner, the tip 248 of the first brace 240 and the tip 288 of the second brace 280 promote alignment during installation by cooperating with the first recess wall 144 and the second recess wall 156, respectively. Further, the first brace 240 and the second brace 280 securely lock the body 104 to the pin 102, preventing or resisting unfastening of the pin 102 from the body 104 in a reverse progression of the configurations described above, and further preventing misalignment in several directions, e.g., clockwise or counter-clockwise rotation, lateral forces, etc.

In the installed configuration, as depicted in FIGS. 5C and 6, a clamping force is created between the pin 102 and the body 104 such that the panel 350 may be secured by the fastener assembly 100. In particular, the clamping force is created between the lower surface 184 of the head 110 and the exterior surfaces 224, 264 of the first and second arms 206, 208, respectively. The clamping force is a result of the shaft 112 being inserted into the body 104. During insertion, the foot surface 132 of the shaft 112 causes the first and second braces 240, 280 to move, e.g., rotate, about the first and second proximal hinge portions 300, 304, respectively. As described herein, this movement causes the first and second arms 206, 208 to flex about the exterior and interior flex points 220, 260, 230, 270. In this manner, the first and second arms 206, 208 undergo a controlled collapse or bending movement localized around the exterior and interior flex points 220, 260, 230, 270 that prevents unnecessary and unwanted wear on the body 104. Due to the combination of the movement about the first and second proximal hinge portions 300, 304, the interior flex points 230, 270, and the exterior flex points 220, 260, a first clamping portion 328 of the first arm 206 and a second clamping portion 330 of the second arm 208 exert a force, i.e., a portion of the total clamping force, against the panel 350. In some examples, the first arm 206 and the second arm 208 may include a textured surface therealong. For example, the first clamping portion 328 and the second clamping portion 330 may include textural features, e.g., knurling, ribs, dots, etc., that can increase frictional resistance with the panel 350.

Figure 7:
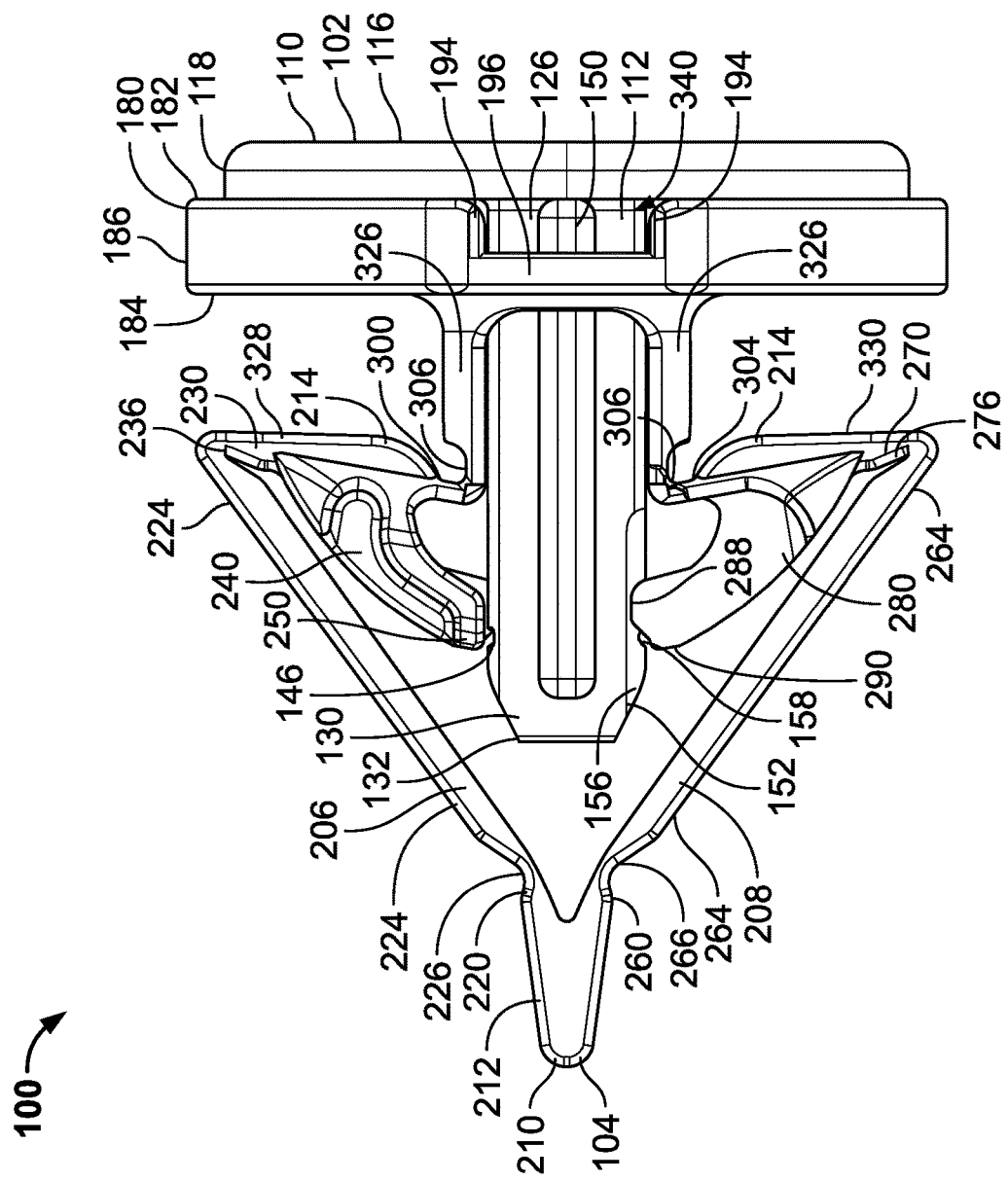
FIG. 7 is a left side elevational view of the fastener assembly of FIG. 1, the fastener being depicted in an installed configuration.

With reference to FIG. 7, a gap 340 is defined between the bottom surface of the head 110 and the upper thin section 192, defined by the track walls 194 and the straight side 196 of the peripheral edge 186. A user can insert a tool, e.g., a flat head screwdriver, inside the gap 340 to pry the pin 102 from the body 104. In this manner, the fastener assembly 100 is capable of being extracted, or uninstalled, and subsequently serviced, or replaced, after installation. After the pin 102 is removed from the body 104, the fastener assembly is configured to be re-installed elsewhere. For example, right and left sidewalls 120, 126 of the shaft 112 are provided without any laterally disposed grooves or slots that could engage the ribs 310, 312, and the axial channels 128, 150 of the shaft 112 are sized and shaped to prevent the tip 248 of the first brace 240 and the tip 288 of the second brace 280 from insertion, thus causing misalignment that a user can notice and correct.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the examples disclosed and defined herein extend to all alternative combinations of two or more of the individual features mentioned or evident from the text and/or drawings. All of these different combinations constitute various alternative aspects of the present disclosure. The claims are to be construed to include alternative examples to the extent permitted by the prior art.

The invention claimed is:

1. A fastener assembly, comprising:
   a pin having a shaft extending from a head of the pin; and
   a body having a unitary flange component including a central passage defined therethrough, a first arm, a second arm, and a nose,
   wherein the shaft is configured to be inserted into the central passage, wherein the first and second arms and are joined at a distal end that is near the nose,
   wherein the first and second arms are joined to the flange at a proximal end that is opposite the distal end,
   wherein each of the first arm and the second arm includes an exterior flex point, an interior flex point, and an arcuate brace, the arcuate brace of the first arm extending toward the second arm, and
   wherein, when the shaft is inserted into the central passage, each of the first arm and the second arm is configured to pivot about the exterior flex point and the interior flex point.

2. The fastener assembly of claim 1, wherein the shaft of the pin includes a first notch, the body includes a first rib, and the first notch is figured to receive the first rib.

3. The fastener assembly of claim 2, wherein the first notch is positioned on a first recess wall adjacent a first recess surface.

4. The fastener assembly of claim 2, wherein the first rib is disposed within the central passage.

5. The fastener assembly of claim 2, wherein the shaft of the pin includes a second notch, the body includes a second rib, and the second notch is configured to receive the second rib.

6. The fastener assembly of claim 5, wherein the second notch is positioned on a second recess wall adjacent a second recess surface.

7. The fastener assembly of claim 6, wherein the shaft of the pin includes a second slot positioned nearer to the head than the second notch, the second slot being configured to receive a second rib.

8. The fastener assembly of claim 6, wherein the body includes a pair of tips that cooperate with a first recess wall and the second recess wall on the shaft of the pin.

9. The fastener assembly of claim 5, wherein the first rib and the second rib are disposed within the central passage.

10. The fastener assembly of claim 5, wherein when the shaft of the pin is partially received within the central passage of the body, the first notch and the second notch are positioned near the flange.

11. The fastener assembly of claim 5, wherein when the shaft of the pin is fully received within the central passage of the body, the first notch and the second notch are spaced apart from the flange.

12. The fastener assembly of claim 2, wherein the shaft of the pin includes a first slot positioned nearer to the head than the first notch, the first slot being configured to receive the first rib of the body.

13. The fastener assembly of claim 1, wherein the pin and the body are integrally formed.

14. The fastener assembly of claim 1, wherein the pin becomes detached from the body prior to installation.

15. The fastener assembly of claim 1, further comprising:
   a panel having an opening configured to receive the pin and the body, and
   wherein, when the fastener assembly is inserted into the opening and the pin is inserted within the central passage of the body, the pin and the nose move toward the panel.

16. The fastener assembly of claim 15, wherein the head of the pin has a lower surface that is configured to face the panel without contacting the panel.

17. The fastener assembly of claim 1, wherein the body defines a V-shaped area that is configured to at least partially receive the shaft.

18. A fastener assembly, comprising:
   a pin having a shaft that extends away from a lower surface of a head; and
   a body having a unitary flange component including a central passage defined therethrough, a nose, a first arm, and a second arm, wherein the first arm and the second arm are both coupled to the flange and the nose at opposing ends,
   wherein the first arm and the second arm both include a first hinge portion and a second hinge portion,
   wherein the first arm is configured to move about the first hinge portion and the second hinge portion and the second arm is configured to move about the first hinge portion and the second hinge portion when the shaft is inserted into the central passage,
   wherein a first brace extends from the first arm and a second brace extends from the second arm,
   wherein the body includes a pair of ribs disposed within the central passage,
   wherein the shaft includes a foot, a first surface, a second surface, a pair of notches, and a pair of slots, and
   wherein the pair of ribs are configured to fit within at least one of the pair of notches or the pair of slots, and the first brace and the second brace are configured to engage the first surface and the second surface of the shaft.

19. The fastener assembly of claim 18, wherein the pair of notches includes a first notch on the first surface and a second notch on the second surface.

20. The fastener assembly of claim 18, wherein the pin and the body are integrally formed and connected by a detachable molding tab.

* * * * *